UNITED STATES PATENT OFFICE.

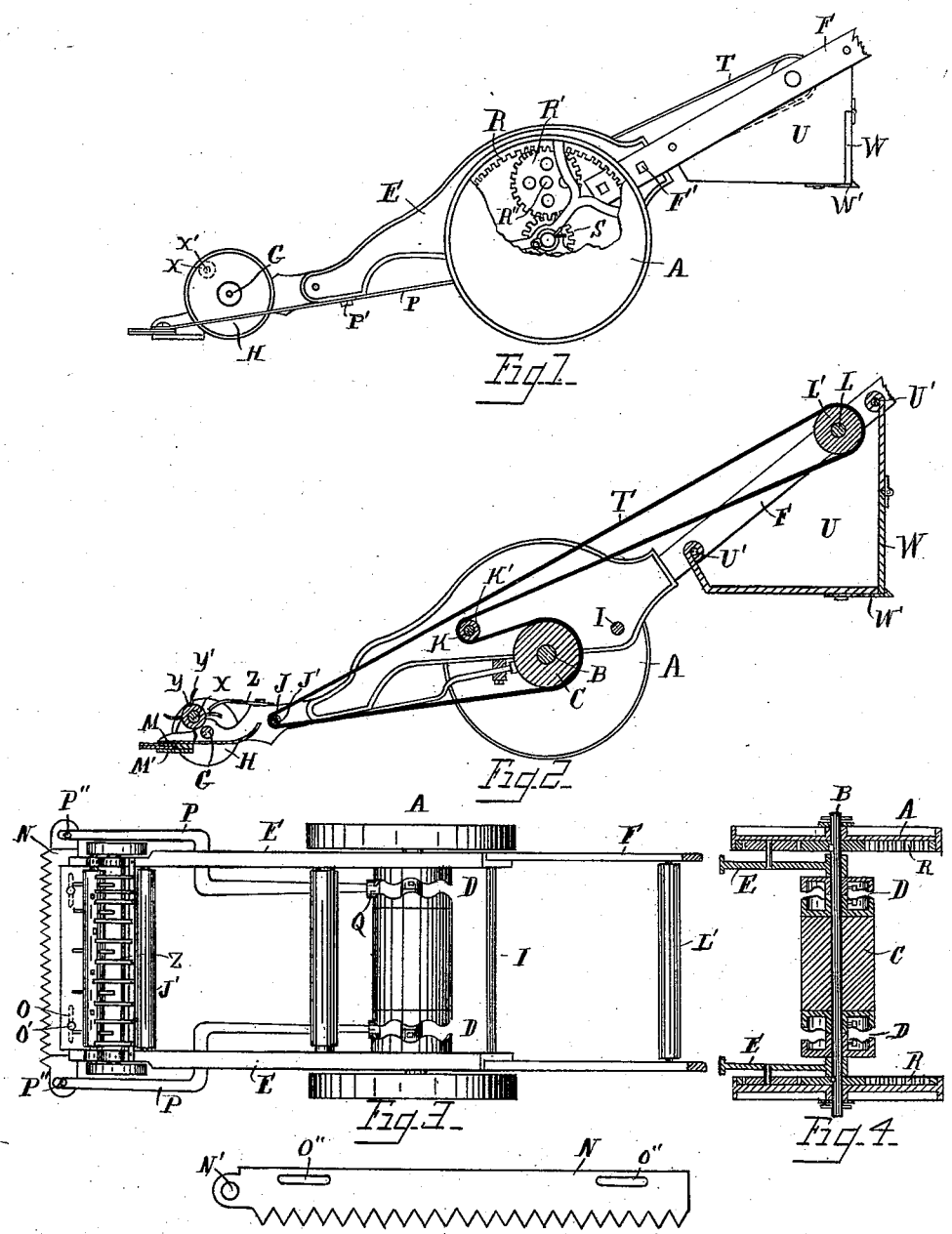

THEODORE R. McDONALD, OF MARION, OHIO, ASSIGNOR OF ONE-HALF TO HOWARD R. BOLANDER, OF SAME PLACE.

LAWN-MOWER.

SPECIFICATION forming part of Letters Patent No. 414,842, dated November 12, 1889.

Application filed June 8, 1889. Serial No. 313,581. (No model.)

*To all whom it may concern:*

Be it known that I, THEODORE R. McDONALD, a citizen of the United States, residing at Marion, in the county of Marion and State of Ohio, have invented certain new and useful Improvements in Lawn-Mowers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to lawn-mowers of that character in which the grass is cut by the reciprocation of sickle-edged knives, the object being to actuate the oppositely-reciprocating knives in a manner to cause the same to sever the growth of vegetation in front thereof irrespective of the height of growth.

Another object is to provide means by which the cut grass may be received from the knives and conveyed to a receptacle in rear thereof and transported to a place of deposit remote from the lawn.

Another object is to speed the gearing from a direct axial line from the source of power.

A further object is to provide means whereby the cut grass is positively delivered to the conveyer without possibility of clogging.

The invention consists in the parts and combination of parts hereinafter described, and pointed out in the claims.

In the drawings, Figure 1 is a side elevation of a complete device constructed in accordance with my invention, a portion being broken away to disclose the power mechanism. Fig. 2 is a longitudinal vertical section of the same. Fig. 3 is a plan view of the mower mechanism with the conveyer removed. Fig. 4 is a plan view of a transverse section (the upper half being removed) of the traction-wheels, gearing, and central motor for actuating the conveyer. Fig. 5 is a plan view of one of the sickle-edged knives.

A designates the traction-wheels loosely mounted on the axis B, upon which is keyed or otherwise secured a thimble C, either sectional or solid, and in which is formed a serpentine cam-groove D at or near each end thereof.

E represents metal side frames, in which axis B is journaled, and extending forwardly from this point at an inclination to project horizontally in alignment, or nearly so, with the lower periphery of the wheels A, the upper ends of the frames projecting from the journal of axis B in an upwardly-inclined direction and recessed to receive handles F, which are secured thereto by bolts F'. At the lower ends of side frames E are journaled caster-wheels H upon short bolts G, which may be arranged to be adjustable to any height, if desired, to regulate the height of cut of the knives. The side frames are further secured by means of a transverse metal rod I and rods J, K, and L, upon which are placed rollers J', K', and L', respectively, for a purpose hereinafter stated.

M designates an upper, and M' a lower, plate, secured to the side frames at the lower ends and extending from one to the other, to form a guide or way between the plates, into which the serrated knives N reciprocate, the plates being perforated at O to receive bolts or rivets O', which pass through the plates and elongated perforations O'' in the knives to guide the same in their reciprocation and hold them in adjustment. The plate M is extended rearward a short distance, and at its rear end is curved upwardly, as shown, thus making a platform at the rear of the cutter-knives. Each knife N is formed with a perforation N' at one end, in which the end of the actuating-lever, to be presently described, is secured. The knives N are oppositely arranged between the plates M and M' with relation to the perforations N', so that the perforated end of one projects from the side opposite to that of the other, as shown in Fig. 3.

P designates angular levers, one upon each side of the machine, and fulcrumed at P' to the side frame, the lower end being secured to the projecting end of the knife by means of a pivot P'', passed through perforation N' thereof, the upper end of the lever being provided with an anti-friction roller Q, which travels in the serpentine cam-groove D, whereby, when the roller C is revolved, the levers reciprocate the knives in opposite directions, thereby causing a shear cut to the knives.

Each of the traction-wheels is formed with an internal peripheral gear R, into which meshes a pinion R', journaled upon a stud R'', secured to the side frame. The pinion R' intermeshes with a pinion S, secured upon the axis of the cylinder C, whereby, when the traction-wheels are revolved, pinion R' is given a rotary movement, which is communicated to the axis B and cylinder C, thereby causing the knives to reciprocate through the medium of the levers P.

T designates an endless conveyer, extending rearwardly and upwardly from roller J' in rear of the cutting-knives to roller L' over a receptacle for the cut grass and passing around rollers K' and the roller C, which latter gives motion to the conveyer.

U designates a receptacle for the cut grass, which is attached to the handles by bolts U', or in any preferred manner, and preferably consists of a rectangular box formed with a hinged door W at the lower end of the rear side, and is held in place by a catch W', which, when disengaged, allows the cut grass to be discharged by simply bearing down upon the handles to give an inclination to the bottom.

It will be apparent that I may vary the form of receptacle, or may dispense with the use of the same, if desired.

X designates a shaft journaled in the frame and having a friction-roller X' at each end, (see dotted line, Fig. 1,) which bears against the inner periphery of the caster wheels H, thereby causing the shaft to revolve with the revolution of the caster-wheels.

Y designates a toothed roller secured upon shaft X, to revolve therewith to cause the teeth Y' to urge the cut grass from the knives toward the conveyer, and thereby preventing clogging of the same.

Z designates a series of concave fingers secured to the frame and projecting over the toothed roller, whereby, when the teeth Y' of roller Y pass between the teeth Z, the cut grass is prevented from revolving with the teeth Y' and being carried in front of the knives.

It will be seen that by reason of the oppositely-moving reciprocating knives a very slow motion of the levers P is sufficient to operate the machine.

What I claim is—

1. In a lawn-mower, the combination, with a main frame suitably supported upon traction and caster wheels, said traction-wheels being provided with an internal peripheral gear, of a loose sleeve mounted upon the axis of the traction-wheels and having serpentine grooves near each end, the fulcrumed levers pivoted to the main frame, one end of each lever engaging the grooves of the sleeve, and the oppositely-reciprocating cutter-knives attached to the opposite ends of the levers, a pinion keyed to the axis of the sleeve, and a gear-wheel journaled on the frame and intermeshing with the pinion and peripheral gear, substantially as shown and described.

2. In a lawn-mower, the combination, with a cutting mechanism, of an endless conveyer-belt, a receptacle located to the rear of and beneath said conveyer-belt, said receptacle being provided with a hinged door at the lower end of its rear side, and a spring-latch for holding said door, all of said parts being so arranged that by opening the door and the rear portion of the frame downwardly the grass will be discharged from the receptacle, substantially as and for the purpose described.

3. In a lawn-mower, in combination with oppositely-reciprocating knives, a conveyer-belt mounted upon rollers journaled in the frame of the machine, and a sleeve secured to the axis of the traction-wheels, around which the conveyer-belt passes and receives its motion, as and for the purpose set forth.

4. In a lawn-mower, the combination, with the reciprocating knives, of an upwardly-curved platform arranged at the rear thereof, a toothed roller revolving above said platform, a series of downwardly-curved fingers projecting over the toothed roller, levers for operating the cutter-knives, a cam-grooved sleeve adapted to operate the levers, and an endless conveyer-belt arranged at the rear of the platform and operated by the grooved sleeve or drum, substantially as shown and described.

5. In a lawn-mower, the combination, with the cutting-knives, of the levers connected thereto, the grooved sleeve on the axis of the traction-wheels for operating said levers, and an endless conveyer-belt passing around a roller in the rear of the knives and extending around a roller journaled in the handles of the machine and passed over the rear face of the sleeve driven by the traction-wheels, as and for the purpose described.

In testimony that I claim the foregoing as my own I hereby affix my signature in presence of two witnesses.

THEODORE R. McDONALD.

Witnesses:
   HOWARD R. BOLANDER,
   L. P. GROSS.